April 16, 1935.　　　G. F. LUNDQVIST　　　1,998,376
MOTION TRANSMITTING MEANS
Filed Sept. 6, 1933　　　4 Sheets-Sheet 4
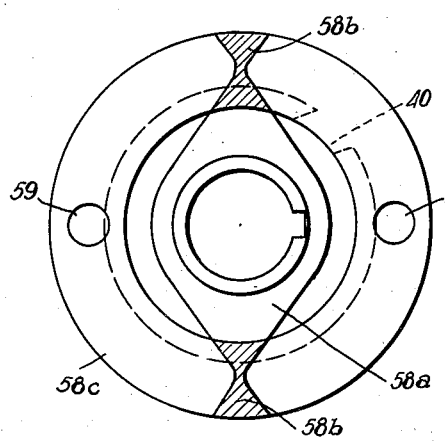
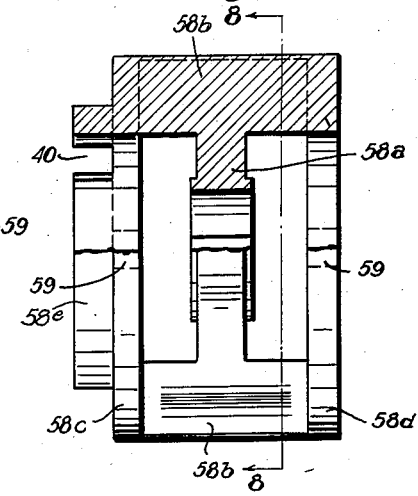
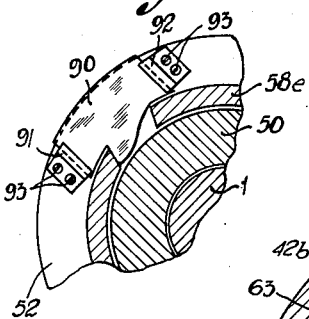
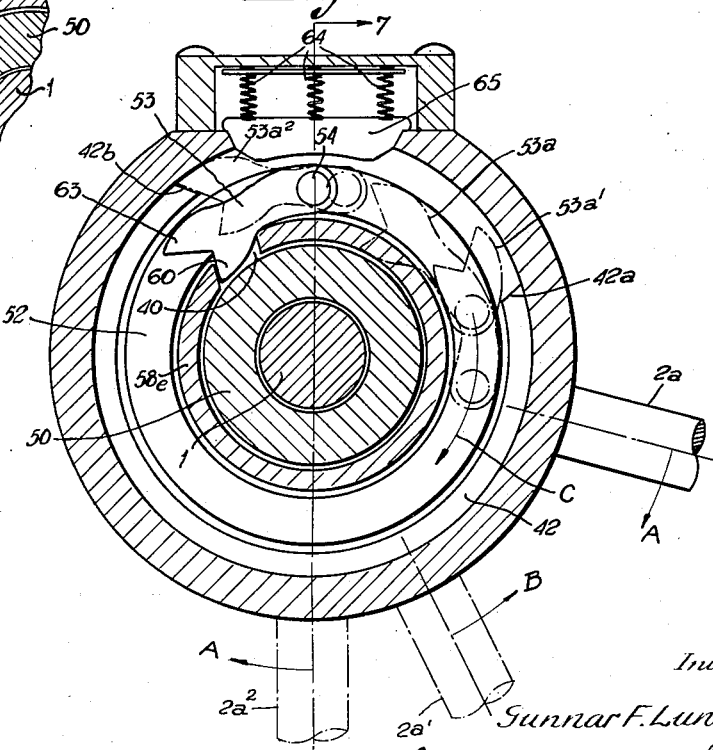
Inventor
Gunnar F. Lundqvist
Attorneys Patented Apr. 16, 1935

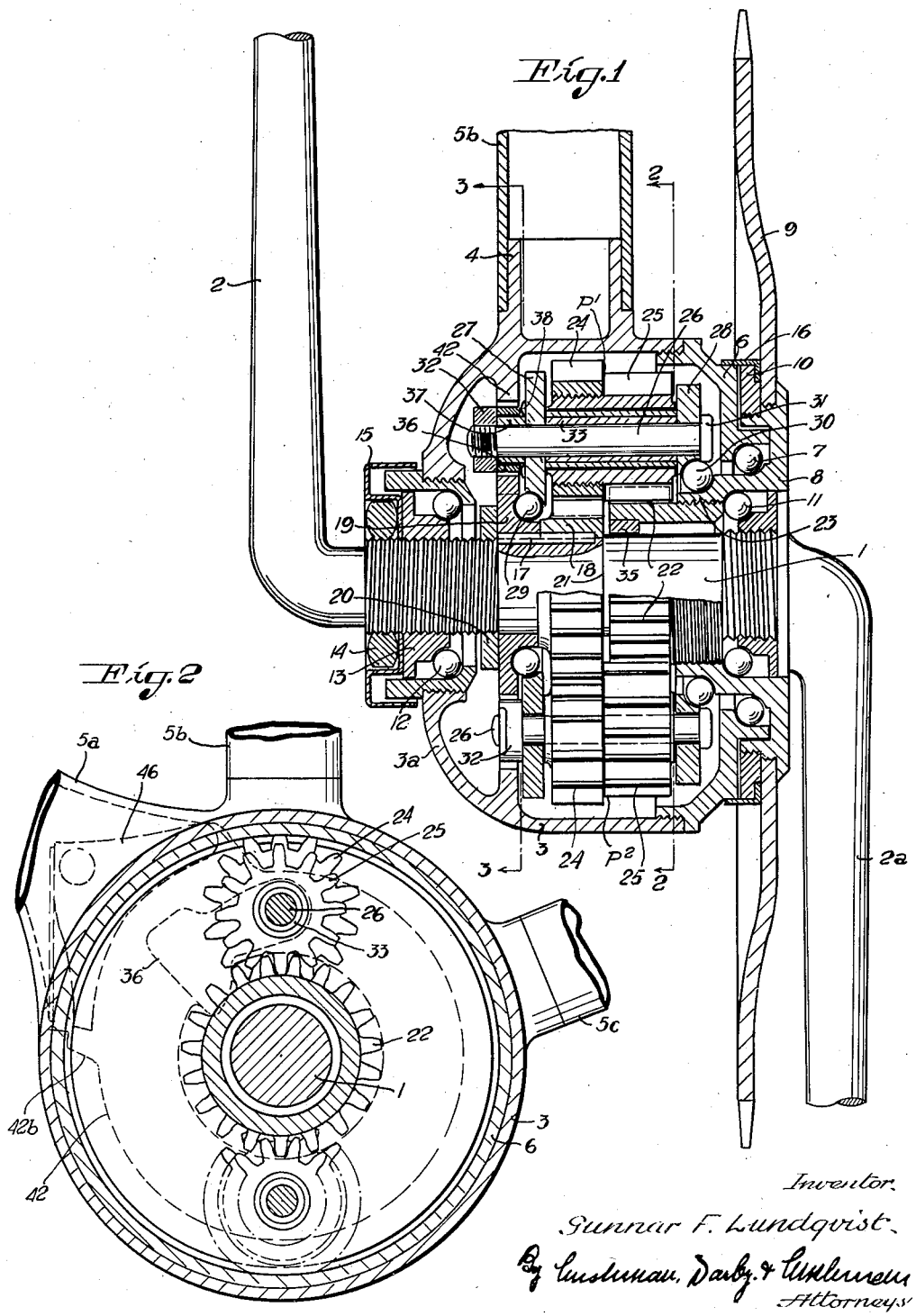

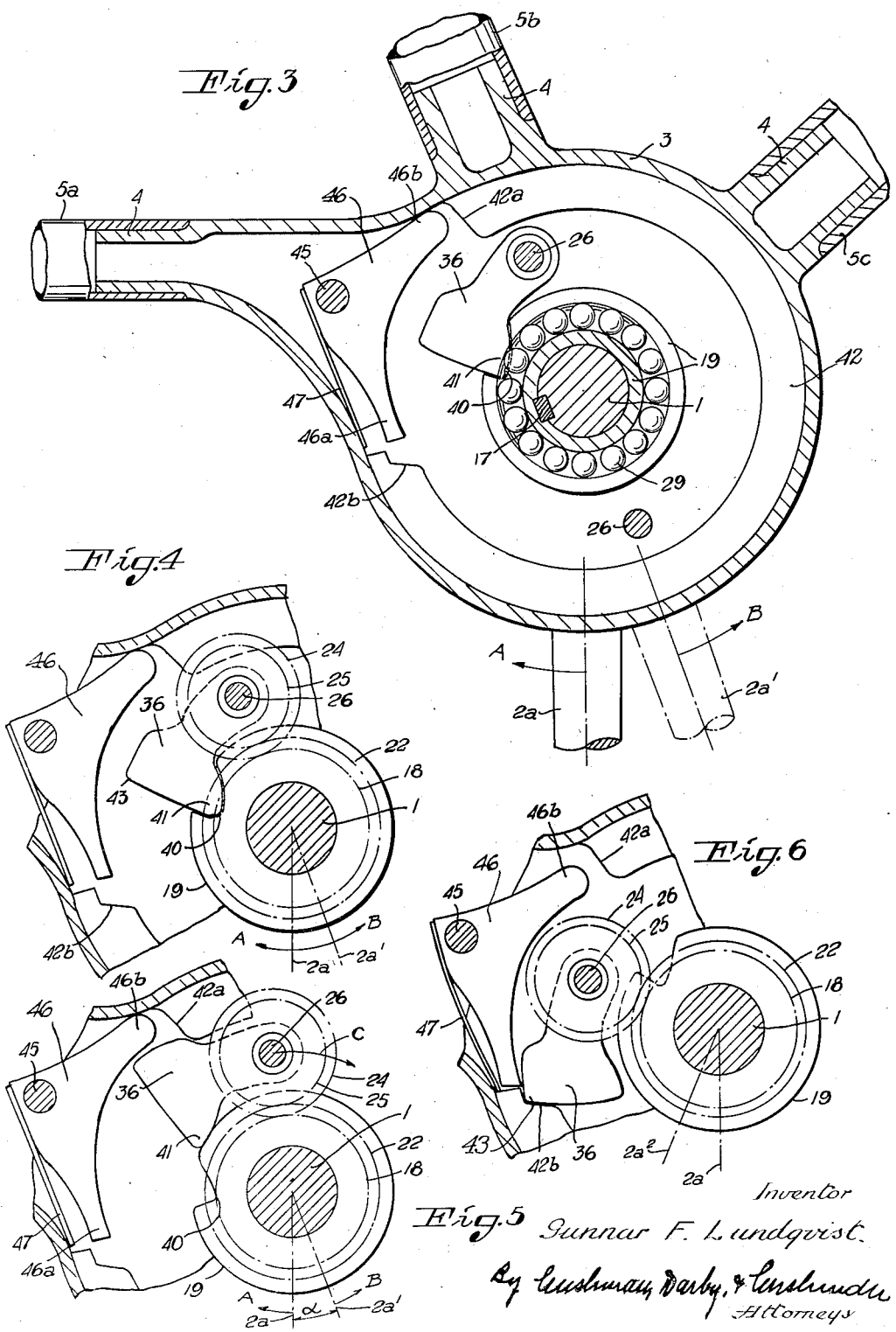

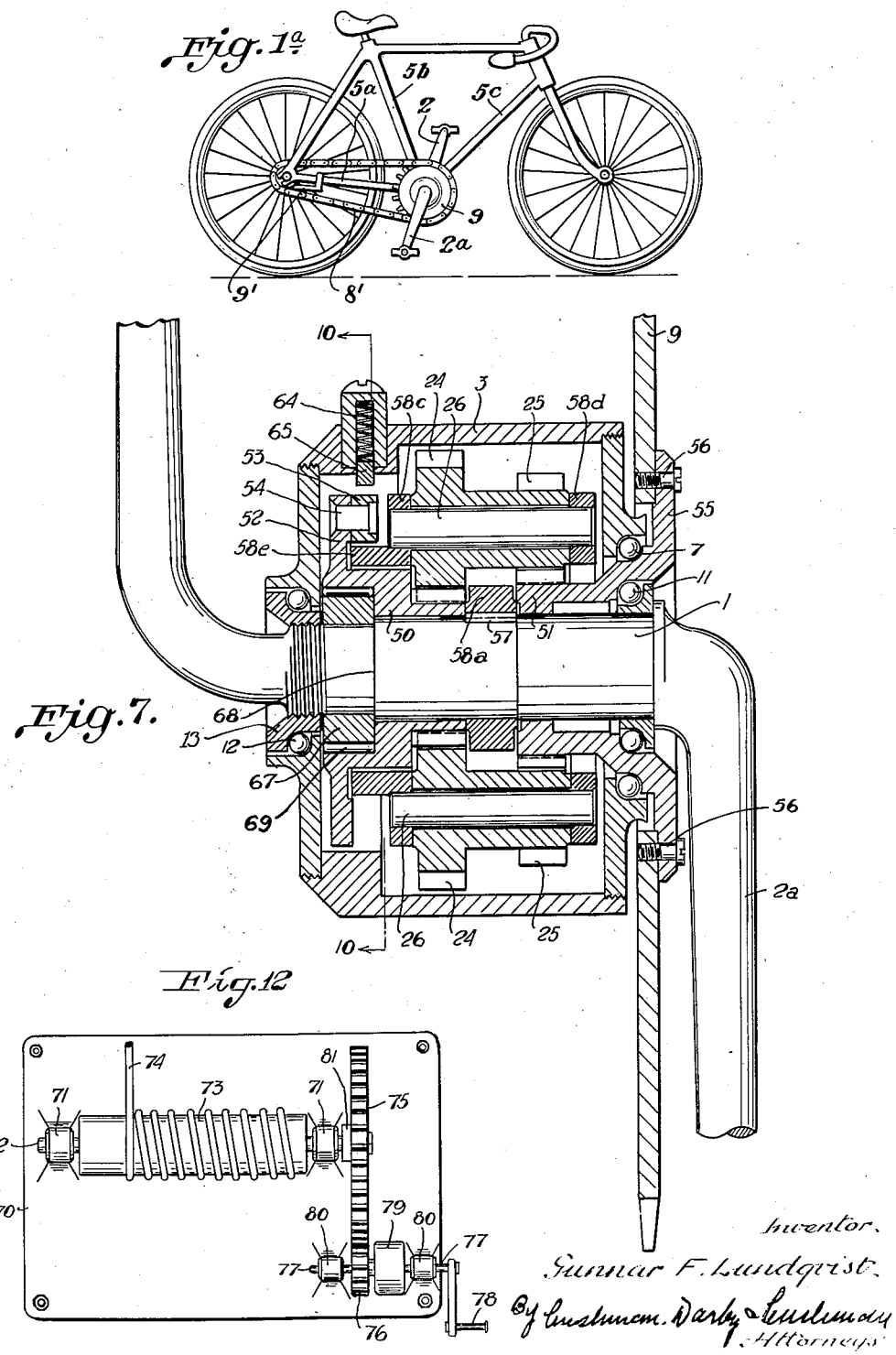

1,998,376

UNITED STATES PATENT OFFICE 1,998,376

MOTION TRANSMITTING MEANS

Gunnar Fredrik Lundqvist, Stockholm, Sweden

Application September 6, 1933, Serial No. 688,390
In Sweden February 4, 1933

22 Claims. (Cl. 208—74)

The present invention relates to means for the transmission of motion between shafts and the like, and has for its object to facilitate direct drive as well as gear drive between the shafts or the like. The invention is especially concerned with such motion transmitting means where an epicyclic gear is provided between the driving part and the driven part, and more particularly refers to means where the driving shaft is rotated by means of a crank, such as is the case for instance in bicycles, winches and the like.

A characteristic feature of the invention is that one of the members of the epicyclic gear (a sun-wheel or the holder for the planet wheel or wheels) carries a locking member adapted to lock the said first-mentioned member with the driving shaft or with a part rigid therewith so as to provide for direct drive, as well as with a stationary part to provide for gear drive between the driving shaft and the driven shaft or the like. Another feature characteristic of the invention is that the change from direct drive to gear drive and vice versa can take place only by the driving shaft being turned through a certain angle in a direction opposed to the driving direction and by the same being then caused to continue the rotation in the original direction.

The arrangement according to the invention will be described more fully in the following with reference to the accompanying drawings which illustrate a few embodiments of the invention by way of example.

Figure 1 is a central vertical section though the crank casing and the epicyclic gear according to a first embodiment of the arrangement as applied to a bicycle. Fig. 1a is a side view of a bicycle showing the invention applied thereto. Fig. 2 is a section on line 2—2 in Fig. 1 and Fig. 3 is a section on line 3—3 in Fig. 1. Figs. 4–6 are diagrammatic representations for the explanation of the principle of gear change. Fig. 7 shows a central vertical section through the crank casing and the epicyclic gear according to a second embodiment adapted likewise to be used in connection with bicycles. Figs. 8 and 9 are a cross section and a longitudinal section respectively of a holder for the planet wheels, and Fig. 10 is a section on line 10—10 in Fig. 7. Fig. 11 shows a modification and Fig. 12 a further embodiment of the invention.

In the drawings, the crank shaft is designated by 1 and the pedal crank arms rigidly connected therewith by 2 and 2a respectively. The crank casing 3 is provided in known manner with rigid projections 4, to which the frame tubes 5a, 5b, 5c are soldered. The frame tube 5a is connected to the bearing of the rear wheel, the frame tube 5b to the saddle holder, and the tube 5c to the front fork sleeve. Screwed to the crank casing 3 at the one end thereof is a cover 6. Rotatably arranged in this cover by means of a ball bearing 7 is a bearing sleeve 8, to the flange-like outer portion of which is secured a sprocket wheel 9 by means of threads, said sprocket wheel transmitting the movement from the pedal cranks to the rear wheel by means of the chain 3'. The sprocket wheel is secured in position by means of a nut 10. The crank shaft 1 is mounted at the one end thereof in the bearing sleeve 8 by means of a ball bearing 11 and at the other end thereof in the end wall 3a of the casing 3 by means of a ball bearing 12. The balls of the bearings 7, 11 and 12 are forced against their races by means of a bearing nut 13 which is threaded onto the shaft 1. Threaded onto the shaft 1 on the outside of the nut 13 is a lock-nut 14, and clamped between the lock nut and the bearing nut is a packing disk 15 which prevents dirt and impurities from entering the crank casing. For the same purpose a packing sleeve 16 is secured between the nut 10 and the sprocket wheel.

Immovably secured to the shaft 1, for instance by means of a key 17, is a gear wheel 18 and a locking disk 19, which are retained in the axial direction by means of a nut 20 threaded onto the shaft so as to press the gear wheel against a boss 21 on the shaft.

With the bearing sleeve 8 which, as stated, is rigidly secured with the sprocket wheel 9, is likewise rigidly connected a gear wheel 22 surrounding the shaft 1 and rotatably mounted with respect to the latter. The gear wheel 22 is provided at its inner end with a bearing bushing 35, by means of which it is slidably mounted on the shaft 1.

The sleeve 8 and the gear wheel 22 are preferably made in separate parts in order to simplify their manufacture said parts being rigidly connected with each other by means of threads 23.

The gear wheel 22 has a greater diameter than the gear wheel 18. These two gear wheels serve as sun wheels in an epicyclic gear the planet wheels of which are designated 24 and 25, the planet wheel 24 meshing with the sun wheel 18 and the planet wheel 25 with the sun wheel 22.

The planet wheels 24 and 25 of each pair of planet wheels are rigidly connected with each other and rotatably mounted on shafts 26, which are carried by and adapted to connect two annular disks 27, 28 arranged on both sides of the planet wheels, said disks being revolvingly mounted relatively to the shaft 1 as well as in regard to the bearing sleeve 8 and the sprocket wheel 9 by means of ball bearings 29, 30. The shafts 26 are provided at one end with flanges 31 bearing on the outside of the disk 28. At the opposite end, the shafts are provided with threads, and nuts 32 screwed onto these threads are adapted to press the disks 27 and 28 toward each other. Surrounding the shafts 26 are sleeves 33 adapted to keep the disks at a suitable distance from each other, so that the pair of planet wheels 24, 25 may rotate freely relatively to the shafts 26.

The arrangement above described is such that if the disks 27 and 28 and thus also the shafts 26 be rigidly connected with the crank shaft 1 by suitable means so as to be entrained when the latter rotates, the planet wheels 24 will be retained immovably by the teeth of the sun wheel 18, so that the pair of planet wheels cannot rotate relatively to the sun wheel 18, that is to say with respect to the shaft 1. This being established, there can be no rotation of the gear wheels 25 and 22 relatively to each other, the connection between these wheels also remaining rigid. Consequently, the sun wheel 22 and thus also the bearing sleeve 8 and the sprocket wheel 9 will rotate together with the shaft 1 as a rigid unit therewith. In this case, the crank shaft is thus coupled directly to the sprocket wheel in the same way as in an ordinary bicycle.

On the other hand, if the rigid connection of the disks 27 and 28 and of the shafts 26 with the shaft 1 is discontinued and these parts are instead connected with the crank casing the planet wheel 24 will rotate about its axis by reason of the tooth engagement with the sun wheel 18. This rotation is transmitted through the planet wheel 25 to the sun wheel 22 and thus to the sprocket wheel 9. On account of the ratio of gear between the gear wheels 18 and 24 on the one hand and the gear wheels 25 and 22 on the other hand, the sprocket wheel will obtain a smaller rotational speed than the crank shaft 1, whereby a greater tractive power is transmitted to the rear wheel of the bicycle.

The arrangement by means of which the holder 27, 28 of the planet wheels can be connected with the shaft 1 on the one hand and with the crank casing on the other hand comprises a locking member which in the present case consists of a pawl 36, which is pivotally mounted on one of the shafts 26 between the disk 27 and the nut 32. The pawl does not bear directly on the shaft 26, but is loosely mounted on a sleeve 37, which is secured between the disk 27 and the nut 32. The pawl 36 should move heavily on its bearing so as not to swing downwardly by its own weight. This may be provided for by suitably adapting the length of the sleeve 37. It is also possible, however, to arrange an annular resilient washer 38 between the pawl and the disk 27 for the same purpose.

Shifting of the pawl may be effected in different ways. According to the manner described hereinbelow, shifting is effected by means of the pedal crank, so that the driving individual, when he desires to throw in the gear, only has to turn the crank arm by his foot a small distance rearwardly, that is to say in a direction opposed to the driving direction, when the pedal is in its lowermost position. The same movement is also made use of when it is desired to make a change from gear drive to direct drive. The appertaining means are as follows:

In the locking disk 19 keyed to the shaft 1 (Fig. 3) is provided a peripheral recess 40 receiving a projection 41 of the pawl 36 at direct drive. When the pedals are moved in the direction of the arrow A, the locking disk 19 and the pawl 36 entrain the planet wheels and the sprocket wheel 9 in rigid connection with the shaft 1, in the manner above described. Arranged on the inside of the crank casing is a flange 42 (Figs. 1 and 3), which is disposed immediately above the pawl 36. This flange prevents the pawl from swinging outwardly when it occupies the recess 40 of the locking disk. The flange is interrupted for a certain distance which is limited by the flange borders 42a and 42b. Between the flange borders, a double-armed plate 46a, 46b is pivotally mounted on a pin 45 secured in the crank casing, said plate being kept by a spring 47 in such a manner that its lower arm 46a will be at approximately the same distance from the center of the bearing as the flange 42. The upper arm 46b on the other hand, is at a greater distance from the center of the bearing. The recess 40 of the locking disk 19 is located relatively to the shaft 1 and the crank arm 2a in such a manner as to be in front of the free space between the flange borders 42a and 42b, when the crank arm 2a is in or approximately in its lowermost position, as shown by full-drawn lines in Fig. 3.

Now, if it is desired to throw in the gear, this is effected by the pedal 2a being moved from the position indicated by full lines in Fig. 3 toward the position $2a^1$ indicated by chain-dotted lines, in the direction of the arrow B. To render this possible, the bicycle is provided with a free-wheel or coaster brake 9' of any well known type, which brake is associated with the rear wheel and connected to the sprocket wheel 9 by the chain 8' so as to be operable by the pedals 2 and 2a (Fig. 1a). The process which then takes place is illustrated in the diagrammatic Figures 4, 5, and 6, which show a detail of Fig. 3, wherein also the gear wheels of the epicyclic gear are indicated.

When the crank arm 2a is turned in the direction of the arrow B, the sun-wheel 18 and the locking disk 19 will also be turned in the same direction. The sun-wheel 22, which is rigidly connected with the sprocket wheel 9, is retained by the brake 9' so as to remain in its position. The planet wheel 25, which is rotated by the planet wheel 24 meshing with the sun-wheel 18, will thus roll on the stationary sun-wheel 22, whereby the holding disks of the planet wheels, the shaft 26 and the pawl 36 are turned in the direction of the arrow C (Fig. 5). The recess 40 and the projection 41 of the pawl are of such a shape that these parts are moved out of engagement with each other, so that the pawl will slide up on the circular cam of the locking disk 19 when the crank arm 2a has been turned through the angle α. The movement of the pawl in the direction of the arrow C is limited by the border 42a of the flange 42. After the pawl has in this manner been moved out of engagement with the locking disk 19 (Fig. 5), the crank 2 is again treadled forward in the direction of the arrow A. Here the direction of rotation of the planet wheels 24, 25 is also reversed, so that the pawl is moved in a direction opposed to that indicated by the arrow C. The pawl now has no tendency to enter the recess 40, but slides past the same until its abutting surface 43 hits the end surface 42b of the flange 42 (Fig. 6), which will take place when the crank arm assumes the position $2a^2$. During the first portion of this movement the pawl freely passes under the spring-actuated plate 46, and when during the latter portion of the movement the arm 46a of said plate bears on the pawl, the latter already has passed the recess 40 so as to be free from the latter. During the continued rotation of the crank 2 and the shaft 1 in the direction of the arrow A the pawl is retained by the abutting surface 42b, whereby the holding disks 27 and 28 of the planet wheels become locked to the casing 3. As explained hereinbefore, the movement of the pedal shaft 1 is then transmitted through the wheels 18, 24, 25, 22 to the sprocket wheel at a gear, the ratio of which is determined by the relation chosen between the various pitch diameters of the gear wheels in the construction of the gearing. The recess 40 in the locking disk cannot engage with the pawl, since the latter is retained by the abutting surface 42b.

Transition from gear drive to direct drive is effected by the same operation, in that the pedal arm 2a is moved in the direction of the arrow B from the position shown by full-drawn lines (Fig. 3) to the position $2a^1$. It should be noted that when this operation commences, the pawl is in the position shown in Fig. 6, while the recess of the disk 19 takes the position shown in Figs. 3 and 4. When the pedal is now moved toward the position $2a^1$, the recess 40 moves in the direction of the arrow B and the pawl in the direction of the arrow C, in the manner explained with reference to Fig. 5. The recess 40 of the disk 19 and the pawl 36 move toward each other and meet in a position where the spring-actuated arm 46a engages the pawl, so that the latter will be pressed into the recess 40. This takes the place when the crank arm has reached the position $2a^1$. After that, the treadling is resumed in the direction of the arrow A, and coupling for direct drive is reached.

If the crank arm is turned rearwardly farther than to the position $2a^1$, the pawl will be caused to bear on the border 42a as in the first case. If the pedal is pressed further backwards, this will entail a braking effect, in that a turning moment is transmitted through the sun wheel 22 to the sprocket wheel. If braking is carried out when the pawl is situated under the flange 42, the pawl will be prevented from being released at direct drive, and the braking will thus take place in the same manner as in an ordinary bicycle with a free-wheel hub.

In the embodiment according to Figs. 7–10, which in principle operates in the same manner as the first embodiment, the two sun wheels 50, 51 of the epicyclic gear are rotatably mounted on the shaft 1. The wheel 50 is made integral with a flange portion 52, on which the pawl 53 is pivotally mounted by means of a rivet 54. To prevent the wheel 50 from being displaced outwardly, there is arranged a ring 67 on the shaft, which ring is pressed by a nut 13 against an abutment 68 on the shaft 1. Arranged between the outside of the ring 67 and the flange portion 52 is a roller bearing 69 adapted to take up the pressure of the pawl when the latter is in locked position. The sun wheel 51 carries a flange-like part 55, to which the sprocket wheel 9 is attached by means of screws 56. The ball bearings 7, 11 and 12 are arranged in the same manner as in the previous example. Contrary to the arrangement according to the first example of embodiment, the holder for the planet wheels 24, 25 of the epicyclic gear is here rigidly connected with the driving shaft 1. This holder consists of a hub portion 58a secured to the shaft by means of a key 57, said hub portion being connected with disks 58c and 58d respectively by means of bridges 58b (see also Figs. 8 and 9). Provided in these disks are apertures 59, and extending through these apertures are shafts 26 carrying the planet wheels 24, 25. From the ring 58c of the holder projects a flange 58e, in which is provided a recess 40 engaged by the projection 60 of the pawl 53 when the crank shaft is coupled directly to the sprocket wheel.

In this case, too, there is arranged a flange 42 in a crank casing, against the inside of which flange the pawl bears during the greater portion of the revolution. This flange likewise is provided with abutting surfaces 42a and 42b for the pawl 53, and the latter has a projection 63 which cooperates with said surfaces. Between the abutting surfaces 42a and 42b there is arranged a member 65 actuated by springs 64, which member tends to press the pawl downwardly, when the latter takes a position underneath said member. In the position occupied by the pawl 53 in Fig. 10 the crank arm 2a is in the position shown by full-drawn lines, the arrangement being then coupled for direct drive, since the pawl is all the time in engagement with the flange 58e rigidly connected to the shaft 1. When the pedal arm has reached the position $2a^2$ shown by chain-dotted lines, the pawl has been moved into the position 53a. If it is then desired to throw in the gear, the pedal will be moved rearwardly in the direction of the arrow B toward the position $2a^1$, as in the previous example, and when this position is reached, the pawl takes the position $53a^1$. When the crank movement again takes place in the direction of the arrow A, the pawl will be moved into the position $53a^2$, where it engages the surface 42b and is retained by the casing, so that a rigid connection with the latter is established. Here the gear wheel 50 will thus also be rigidly connected with the casing, and as the forward rotation of the crank shaft 1 is continued, the planet wheel 24 will roll on the stationary sun wheel 50 and will thus obtain a rotary movement. This rotary movement is transmitted through the planet wheel 25 to the sun wheel 51 and thus to the sprocket wheel 9 at a gear, the ratio of which depends on the relation between the pitch diameters chosen for the gear wheels of the gearing.

The change for direct drive is effected in an analogous manner.

The pawls 36 and 53, respectively, need not necessarily be pivotally arranged, but may also be arranged to be displaced on its support in a radial direction. An example of such an arrangement is illustrated in Fig. 11. According to this figure, the locking member 90 is arranged to be displaced radially on the flange portion 52 in two guides 91, 92 secured to the part 52 by means of screws 93. Otherwise this arrangement operates in the same manner as those hereinbefore described.

Obviously, it is not necessary that the locking members 36 and 53, respectively, be provided with a locking tooth engaging a recess or slit in the opposite member. This latter may instead be provided with a projection cooperating with a recess in the locking member.

As will be seen from the two examples of embodiment described, the gear wheels of the epicyclic gear are in constant engagement with each other. The teeth will thus not be subjected to the risk of being damaged on a carelessly performed change of gear, as is the case when the gear wheels are arranged to be moved into and out of engagement with one another.

The extremely simple arrangement for making a change for and from direct drive and gear drive as provided for by the invention is also applicable to vehicles other than bicycles. The arrangement may also be applied to winches and windlesses, for example. An example of the arrangement in this case is shown diagrammatically in Fig. 12 which illustrates an ordinary simple purchase or windless in plan view.

According to Fig. 12, a shaft 72 is rotatably mounted in bearings 71 on a base plate 70, said shaft 72 carrying a drum 73 onto which the rope or wire 74 is wound up or from which it is paid out. On the shaft 72 is furthermore secured a large gear wheel 75 meshing with a smaller gear wheel 76 arranged on the same geometrical axis as the crank shaft 77. Rigidly connected with the crank shaft 77 is a crank arm 78, by means of which the windlass is turned. The crank shaft 77 has arranged thereon a gearing 79 of the same construction as those hereinbefore described, although the dimensions are evidently adapted to the greater strains that may occur here. The one sun wheel of this gearing is rigidly connected with the gear wheel 76 in the same manner in which the gear wheel 22 is connected to the sprocket wheel 9 in the example illustrated in Fig. 1. 80 designates bearings for the shaft 77, on which the gear wheel 76 is mounted to be freely rotatable. 81 denotes a frictional or other suitable locking device preventing the shaft 72 and the drum 73 from being turned rearwardly in the winding-up of the rope 74 when the crank 78 is turned in the direction opposed to the normal one in making the change of gear. If the load on the rope 74 is increased, or if for some other reason it is desired to reduce the exertion for the turning of the crank 78, the individual who turns the crank only has to move the latter backwards by an inconsiderable angle corresponding to the angle $\alpha$ in Fig. 5, in order to throw in the gearing 79 so as to increase the whole ratio of gear of the windlass. If the pull in the rope 74 is reduced, or if for some other reason it is desired to increase the speed, it is only necessary again to perform the same manipulation with the crank 78, in order thus to rigidly couple the shaft 77 to the gear wheel 76.

The invention is obviously also applicable to the transmitting of motion between shafts or the like where the driving shaft obtains its movement in some other manner than through crank arms. The locking member may also be moved between its different abutting points in some other manner than by a return movement of the driving shaft. It may thus be shifted by motion transmitting means of a type known per se and adapted to be controlled by a handle, a lever or the like.

What I claim is:—

1. In a motion transmitting means for bicycles in combination, a pedal shaft, pedal arms rigidly connected with said pedal shaft, an epicyclic gear, a sprocket wheel connected with a member of said epicyclic gear, and means operable in a vertical position of said pedal arms by a slight backward movement of said pedal shaft for uncoupling direct drive and coupling gear drive and vice versa whereby when gear drive is in operation to couple the pedal shaft to the sprocket wheel and when direct drive is in operation to couple the gear drive between the pedal shaft and sprocket wheel.

2. In a motion transmitting means in combination, an epicyclic gear comprising a primary sun wheel, a secondary sun wheel, and at least one pair of planet wheels, a driving member rigidly connected with said primary sun wheel, a stationary part, a locking member connected with one of said planet wheels and adapted to engage either said primary sun wheel or said stationary part, a driven member rigidly connected with said secondary sun wheel, and a free-wheel brake operatively associated with the driven member, said driving member arranged upon being moved in a direction opposite to its driving direction to effect change of gear.

3. In a motion transmitting means in combination, a driving shaft, a primary sun wheel rigidly connected with said driving shaft, a secondary sun wheel, a second shaft, a pair of planet wheels rotatably mounted on said second shaft and rigidly connected with each other, the primary planet wheel being adapted to mesh with said primary sun wheel, the secondary planet wheel being adapted to mesh with said secondary sun wheel, a stationary part, a locking member connected with said second shaft and adapted to engage either said primary sun wheel or said stationary part, a driven member rigidly connected with said secondary sun wheel, and a free-wheel brake operatively associated with the driven member, said driving member arranged upon being moved in a direction opposite to its driving direction to effect change of gear.

4. In a motion transmitting means in combination, an epicyclic gear comprising a primary sun wheel, a secondary sun wheel, and at least one pair of planet wheels, said secondary sun wheel having a greater diameter than said primary sun wheel, a stationary part, a locking member connected with said planet wheels and adapted to engage either said primary sun wheel or said stationary part, a driven member rigidly connected with said secondary sun wheel, and a free-wheel brake operatively associated with the driven member, said driving member arranged upon being moved in a direction opposite to its driving direction to effect change of gear.

5. In a motion transmitting means in combination, a driving shaft, a primary sun wheel rigidly mounted on said driving shaft, a secondary sun wheel, a second shaft, a pair of planet wheels rotatably mounted on said second shaft and rigidly connected with each other, a locking disc rigidly mounted on said driving shaft, a stationary part, a locking member pivotally mounted on said second shaft and adapted to engage either said locking disc or said stationary part, a driven member connected with said secondary sun wheel, and a free-wheel brake operatively associated with the driven member, said driving member arranged upon being moved in a direction opposite to its driving direction to effect change of gear.

6. In a motion transmitting means in combination, a stationary casing having an inwardly projecting flange with a peripheral recess, a driving shaft, a primary sun wheel rigidly mounted on said driving shaft, a secondary sun wheel, a second shaft, a pair of planet wheels rotatably mounted on said second shaft and rigidly connected with each other, a locking disc having a peripheral recess and being rigidly mounted on said driving shaft, a locking member pivotally mounted on said second shaft and adapted to engage either said recess on said flange or said recess on said locking disc, a driven member connected with said secondary sun wheel, and a free-wheel brake operatively associated with the driven member, said driving member arranged upon being moved in a direction opposite to its driving direction to effect change of gear.

7. In a motion transmitting means in combination, a stationary casing having an inwardly projecting flange with a peripheral recess, a driving shaft, a holder, a second shaft rigidly connected with said holder, a primary sun wheel rigidly mounted on said driving shaft, a secondary sun wheel, a pair of planet wheels rotatably mounted on said second shaft and rigidly connected with each other, a locking disc having a peripheral recess and being rigidly mounted on said driving shaft, a locking member pivotally mounted on said second shaft and adapted to engage either said recess on said flange or said recess on said locking disc, a driven member connected with said secondary sun wheel, and a free-wheel brake operatively associated with the driven member, said driving member arranged upon being moved in a direction opposite to its driving direction to effect change of gear.

8. In a motion transmitting means in combination, a stationary casing, an inwardly projecting flange rigidly connected with said casing, said flange being interrupted for a portion of its periphery so as to form two abutments, a driving shaft, a holder rotatable about said driving shaft, a second shaft rigidly connected with said holder, a primary sun wheel rigidly mounted on said driving shaft, a secondary sun wheel, a pair of planet wheels rotatably mounted on said second shaft and rigidly connected with each other, a locking disc having a peripheral recess and being rigidly mounted on said driving shaft, a pawl mounted on said second shaft and adapted to engage either one of said abutments on said flange or said recess on said locking disc, a driven member connected with said secondary sun wheel, and a free-wheel brake operatively associated with the driven member, said driving member arranged upon being moved in a direction opposite to its driving direction to effect change of gear.

9. In a motion transmitting means in combination, a driving shaft, a stationary casing, an inwardly projecting annular flange rigidly connected with said casing and being interrupted for a portion of its periphery so as to form two abutments, a pin rigidly connected with said casing, a double-armed plate pivotally mounted on said pin, the inner face of said plate being concave, a spring adapted to keep said plate in such a position that the first arm of said plate is at approximately the same distance from said driving shaft as said annular flange and the second arm of said plate is at a greater distance from said driving shaft, a holder rotatably mounted about said driving shaft, a second shaft rigidly connected with said holder, a primary sun wheel rigidly mounted on said driving shaft, a secondary sun wheel, a pair of planet wheels rotatably mounted on said second shaft and rigidly connected with each other, a locking disc having a peripheral recess and being rigidly mounted on said driving shaft, a pawl mounted on said second shaft and adapted to engage either one of said abutments on said flange or said recess on said locking disc and adapted to turn said double-armed plate into such a position that said second arm of said plate is at approximately the same distance from said driving shaft as said annular flange and said first arm of said plate is at a greater distance from said driving shaft, a driven member connected with said secondary sun wheel, and a free-wheel brake operatively associated with the driven member, said driving member arranged upon being moved in a direction opposite to its driving direction to effect change of gear.

10. In a motion transmitting means for bicycles in combination, a pedal crank shaft comprising two pedal arms and a horizontal driving shaft connected with said pedal arms, a stationary casing surrounding said driving shaft, an inwardly projecting annular flange rigidly connected with said casing and being interrupted for a portion of its periphery so as to form two abutments, a pin rigidly connected with said casing between said abutments, a double-armed plate pivotally mounted on said pin between said abutments, the inner face of said plate being ring-shaped, a spring adapted to keep said plate in such a position that the first arm of said plate is at approximately the same distance from said driving shaft as said annular flange and the second arm of said plate is at a greater distance from said driving shaft, a holder rotatable about said driving shaft, a second shaft rigidly connected with said holder, a primary sun wheel rigidly mounted on said driving shaft, a secondary sun wheel having a greater diameter than said primary sun wheel, a pair of planet wheels adapted to mesh with said sun wheels and rotatably mounted on said second shaft and rigidly connected with each other, a locking disc having a peripheral recess and being rigidly mounted on said driving shaft, said peripheral recess being positioned opposite said double-armed plate when one of said pedal arms is in vertical position, a pawl mounted on said second shaft and adapted to engage either one of said abutments on said flange or said recess on said locking disc and adapted to turn said double-armed plate into such a position that said second arm of said plate is at approximately the same distance from said driving shaft as said annular flange and said first arm of said plate is is at a greater distance from said driving shaft, a sprocket wheel connected with said secondary sun wheel, and a free-wheel brake operatively associated with the driven member, said driving member arranged upon being moved in a direction opposite to its driving direction to effect change of gear.

11. In a motion transmitting means for bicycles in combination, a pedal crank shaft comprising two pedal arms and a horizontal driving shaft connected with said pedal arms, a stationary casing surrounding said driving shaft, an inwardly projecting annular flange rigidly connected with said casing and being interrupted for a portion of its periphery so as to form two abutments, a spring-actuated plate projecting through said abutments at the same distance from said driving shaft as said annular flange, a holder rigidly mounted on said driving shaft, a second shaft mounted on said holder, a primary sun wheel rotatably mounted on said driving shaft, a secondary sun wheel having a greater diameter than said primary sun wheel, a pair of planet wheels adapted to mesh with said sun wheels and mounted on said second shaft and being rigidly connected with each other, a locking disc connected with said holder and having a peripheral recess, said peripheral recess being positioned in front of said spring-actuated plate, seen in the direction of rotation of said driving shaft, substantially at right angles to said plate when one of said pedal arms is in vertical position, a pawl pivotally mounted on a projection of said primary sun wheel and adapted to engage either one of said abutments on said flange or said recess on said locking disc, a sprocket wheel connected with said secondary sun wheel, and a freel-wheel brake operatively associated with the driven member, said driving member arranged upon being moved in a direction opposite to its driving direction to effect change of gear.

12. In a motion transmitting means in combination, a stationary casing, an epicyclic gear in said casing, said gear having a first member, a second member, and a third member, a driving shaft rigidly connected with the first member, a locking member connected with the second member and adapted to engage either said first member or said casing, and a driven member rigidly connected with the third member.

13. In a motion transmitting means in combination, an epicyclic gear comprising a primary sun wheel, a secondary sun wheel, and at least one pair of planet wheels, a holder for said planet wheels, a driving member rigidly connected with said holder, a stationary part, a locking member connected with said primary sun wheel and adapted to engage either said holder or said stationary part, and a driven member connected with said secondary sun wheel.

14. In a motion transmitting means in combination, a driving shaft, a primary sun wheel, a secondary sun wheel, a holder rigidly mounted on said driving shaft, a second shaft mounted on said holder, a pair of planet wheels rotatably mounted on said second shaft and rigidly connected with each other, the primary planet wheel being adapted to mesh with said primary sun wheel, the secondary planet wheel being adapted to mesh with said secondary sun wheel, a stationary part, a locking member connected with said primary sun wheel and adapted to engage either said holder or said stationary part, and a driven member rigidly connected with said secondary sun wheel.

15. In a motion transmitting means in combination, an epicyclic gear comprising a primary sun wheel, a secondary sun wheel, and at least one pair of planet wheels, a holder for said planet wheels, said secondary sun wheel having a greater diameter than said primary sun wheel, a stationary part, a locking member connected with said primary sun wheel and adapted to engage either said holder or said stationary part, and a driven member rigidly connected with said secondary sun wheel.

16. In a motion transmitting means in combination, a driving shaft, a primary sun wheel rotatably mounted on said driving shaft, a secondary sun wheel, a holder rigidly mounted on said driving shaft, a second shaft mounted on said holder, a pair of planet wheels rotatably mounted on said second shaft and rigidly connected with each other, a stationary part, a locking member rotatably mounted on a projection of said primary sun wheel and adapted to engage either said holder or said stationary part, and a driven member connected with said secondary sun wheel.

17. In a motion transmitting means in combination, a stationary casing having an inwardly projecting flange with a peripheral recess, a driving shaft, a primary sun wheel rotatably mounted on said driving shaft, a secondary sun wheel, a holder rigidly mounted on said driving shaft, a second shaft mounted on said holder, a pair of planet wheels mounted on said second shaft and rigidly connected with each other, said holder having an annular projection with a peripheral recess, a locking member mounted on a projection of said primary sun wheel and being adapted to engage either said recess on said flange or said recess on said annular projection, and a driven member connected with said secondary sun wheel.

18. In a motion transmitting means in combination, a stationary casing having an inwardly projecting flange with a peripheral recess, a driving shaft, a holder rigidly connected with said driving shaft, a second shaft mounted on said holder, a primary sun wheel rotatably mounted on said driving shaft, a secondary sun wheel, a pair of planet wheels mounted on said second shaft and rigidly connected with each other, a locking disc forming one piece with said holder and having a peripheral recess, a locking member mounted on a projection of said primary sun wheel and adapted to engage either with said recess on said flange or with said locking disc, and a driven member connected with said secondary sun wheel.

19. In a motion transmitting means in combination, a stationary casing, an inwardly projecting flange rigidly connected with said casing, said flange being interrupted for a portion of its periphery so as to form two abutments, a driving shaft, a holder rigidly mounted on said driving shaft, a second shaft mounted on said holder, a primary sun wheel rotatably mounted on said driving shaft, a secondary sun wheel, a pair of planet wheels mounted on said second shaft and rigidly connected with each other, a locking disc having a peripheral recess and forming one piece with said holder, a pawl mounted on a projection of said primary sun wheel and adapted to engage either one of said abutments on said flange or said recess on said locking disc, and a driven member connected with said secondary sun wheel.

20. In a motion transmitting means in combination, a driving shaft, a stationary casing, an inwardly projecting annular flange rigidly connected with said casing and being interrupted for a portion of its periphery so as to form two abutments, a spring-actuated plate pressed between said abutments, the inner face of said plate being at a smaller distance from said driving shaft than said annular flange, a holder rigidly mounted on said driving shaft, a second shaft mounted on said holder, a primary sun wheel rotatably mounted on said driving shaft, a secondary sun wheel, a pair of planet wheels mounted on said second shaft and rigidly connected with each other, a locking disc having a peripheral recess and forming one piece with said holder, a pawl mounted on said second shaft and adapted to engage either one of said abutments on said flange or said recess on said locking disc, and a driven member connected with said secondary sun wheel.

21. In a motion transmitting means in combination, an epicyclic gear including a primary sun wheel, planet wheels, and a secondary sun wheel, a driving member rigidly connected to the primary sun wheel, a stationary element, a locking member connected to the planet wheels and adapted to engage either said primary sun wheel or said stationary element, a driven member rigidly connected to said secondary sun wheel, and a free wheel brake operatively associated with the driven member, said driven member arranged upon being moved in a direction opposite to its driving direction to effect change of gear.

22. Motion transmitting means having in combination, a stationary casing provided with an inwardly projecting annular flange, an epicyclic gear in said casing and including a primary sun wheel, planet wheels, and a secondary sun wheel, a driving shaft rigidly connected with the primary sun wheel, a locking member connected with the planet wheels and adapted to engage either the primary sun wheel or said annular flange, a driven member rigidly connected with the secondary sun wheel and a free wheel brake operatively associated with the driven member, said driven member arranged upon being moved in a direction opposite to its driving direction to effect change of gear.

GUNNAR FREDRIK LUNDQVIST.